(12) United States Patent
Anne et al.

(10) Patent No.: US 9,709,757 B2
(45) Date of Patent: Jul. 18, 2017

(54) SYSTEMS AND METHODS FOR PORT MAPPING

(71) Applicant: CommScope Technologies LLC, Hickory, NC (US)

(72) Inventors: Laxman R. Anne, Eden Prairie, MN (US); Peter Smith, Chester (GB)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/858,237

(22) Filed: Sep. 18, 2015

(65) Prior Publication Data

US 2016/0109662 A1 Apr. 21, 2016

Related U.S. Application Data

(60) Provisional application No. 62/065,422, filed on Oct. 17, 2014.

(51) Int. Cl.
| | | |
|---|---|---|
| G02B 6/38 | (2006.01) | |
| H04Q 1/14 | (2006.01) | |
| H04Q 1/02 | (2006.01) | |
| G02B 6/44 | (2006.01) | |

(52) U.S. Cl.
CPC ........... *G02B 6/3897* (2013.01); *H04Q 1/136* (2013.01); *H04Q 1/148* (2013.01); *G02B 6/4452* (2013.01)

(58) Field of Classification Search
CPC ....................................................... G02B 6/38
USPC .......................................................... 385/75
See application file for complete search history.

(56) References Cited

U.S. PATENT DOCUMENTS

| | | | | |
|---|---|---|---|---|
| 4,880,291 | A * | 11/1989 | Aberson et al. | 385/55 |
| 5,715,348 | A * | 2/1998 | Falkenberg et al. | 385/135 |
| 5,765,198 | A * | 6/1998 | McCrocklin et al. | 711/165 |
| 5,909,298 | A * | 6/1999 | Shimada et al. | 398/164 |
| 6,041,374 | A * | 3/2000 | Postman et al. | 710/73 |
| 6,179,475 | B1 * | 1/2001 | Takamatsu et al. | 385/53 |
| 6,375,362 | B1 * | 4/2002 | Heiles et al. | 385/75 |
| 6,459,175 | B1 * | 10/2002 | Potega | 307/149 |
| 6,757,753 | B1 * | 6/2004 | DeKoning et al. | 710/38 |
| 6,971,895 | B2 * | 12/2005 | Sago et al. | 439/188 |
| 2002/0064349 | A1 * | 5/2002 | Ngo et al. | 385/53 |
| 2002/0081076 | A1 * | 6/2002 | Lampert et al. | 385/70 |
| 2002/0146033 | A1 * | 10/2002 | Benayoun et al. | 370/465 |
| 2003/0002808 | A1 * | 1/2003 | Lampert et al. | 385/70 |
| 2004/0054761 | A1 * | 3/2004 | Colombo et al. | 709/220 |
| 2005/0100033 | A1 * | 5/2005 | Arndt et al. | 370/412 |
| 2005/0120173 | A1 * | 6/2005 | Minowa | 711/114 |

(Continued)

*Primary Examiner* — Kaveh C Kianni
(74) *Attorney, Agent, or Firm* — Fogg & Powers LLC

(57) ABSTRACT

Systems and methods for detecting component rotation within a communication assembly are provided. In certain embodiments, a system includes a plurality of modules; and a plurality of ports installed in each module in the plurality of modules, each port being associated with a port identification number, wherein port identification numbers for the plurality of ports are independently numbered from the port identification numbers for at least one other module in the plurality of modules. The system also includes a management entity configured to identify the ports on the plurality of modules, wherein the management entity uses remapped port identification numbers to identify the ports, wherein each remapped port identification number associated with each port in the plurality of modules is unique.

8 Claims, 3 Drawing Sheets

(56) References Cited

U.S. PATENT DOCUMENTS

| | | | |
|---|---|---|---|
| 2007/0147267 A1* | 6/2007 | Holland | 370/252 |
| 2007/0276965 A1* | 11/2007 | Johnson et al. | 710/8 |
| 2010/0211664 A1* | 8/2010 | Raza et al. | 709/223 |
| 2011/0081144 A1* | 4/2011 | Zhao et al. | 398/20 |
| 2012/0166582 A1* | 6/2012 | Binder | 709/217 |
| 2013/0089291 A1* | 4/2013 | Jol et al. | 385/77 |
| 2014/0226460 A1* | 8/2014 | Kretschmann et al. | 370/218 |
| 2015/0339570 A1* | 11/2015 | Scheffler | 711/114 |

* cited by examiner

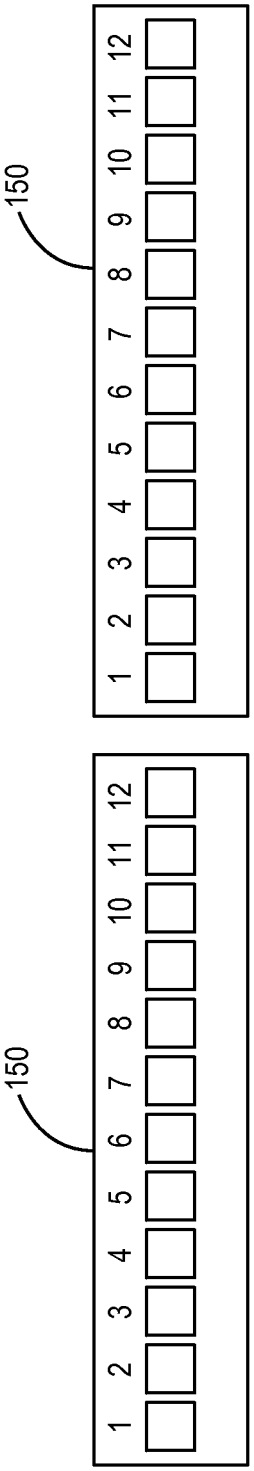
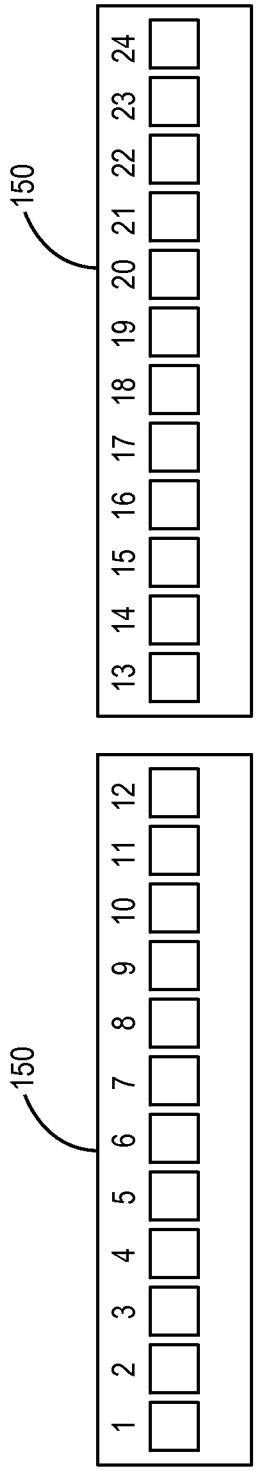
FIG. 2A
FIG. 2B

SYSTEMS AND METHODS FOR PORT MAPPING

CROSS-REFERENCE TO RELATED APPLICATIONS

This application claims the benefit of U.S. Provisional Patent Application Ser. No. 62/065,422, filed on Oct. 17, 2014, which is hereby incorporated herein by reference.

BACKGROUND

Telecommunications networks typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord or cable" cross connects the two together. In other words, a single logical communication link is often implemented using several segments of physical communication media.

Various types of physical layer management (PLM) systems can be used to track connections made at patch panels and other types of equipment used to make connections in communication networks. Generally, such PLM systems include functionality to track what is connected to each port of such equipment, trace connections that are made using such equipment, and provide visual indications to technicians at such equipment (for example, by illuminating an LED that is associated with a patch panel or a port thereof).

One exemplary type of PLM system makes use of an Electrically Erasable Programmable Read-Only Memory (EEPROM) or other storage device that is integrated with or attached to a connector on a cable, fiber, or other segment of communication media. The storage device is used to store information about the connector or cable along with other information. The port (or other connector) into which the associated connector is inserted is configured to read the information stored in the EEPROM or other storage device when the connector is inserted at that port. One example of such technology includes the QUAREO family of products that are commercially available from TE Connectivity.

Another type of PLM system makes use of so-called "ninth wire" technology. Ninth wire technology makes use of special cables that include an extra conductor or signal path (also referred to here as the "ninth wire" conductor or signal path) that is used for determining which port each end of the cables is inserted into. Ninth wire technology can be used with various types of cables, such as, twisted-pair copper cables and optical cables (in the latter case using hybrid optical cables that include one or more copper wires that serve as the ninth wire). One example of ninth wire technology includes the AMPTRAC family of products that are commercially available from TE Connectivity.

Another type of PLM system makes use of radio frequency identification (RFID) tags and readers. With this type of RFID PLM system, an RFID tag is attached to or integrated with a connector on a cable, fiber, or other segment of communication media. The RFID tag is used to store information about the connector or segment of communication media along with other information. The RFID tag can be read after the associated connector is inserted into a corresponding jack or other port using an RFID reader.

PLM systems typically include management software that aggregates the captured information and stores it in one or more databases. One example of such management software is the Infrastructure Configuration Manager (ICM) software that is commercially available from TE Connectivity.

In addition to information about the connections and cabling used to make them, these databases also typically store information about the other equipment used to make the connections. Examples of such equipment include patch panels, distribution frames, and active networking devices such as switches, routers, and gateways. Examples of information that is stored in the database about such equipment include information about the make and model of the equipment and where it is installed in the network.

Typically, information about where such equipment is installed in the network must be manually entered. This is commonly the case even for "intelligent" equipment that can be automatically discovered by the PLM management software and queried for its identification information (for example, serial number and make and model).

For example, in one common usage scenario, a chassis may be designed to hold multiple adapter packs on one or more trays that slide in and out of the chassis. Each adapter pack comprises multiple optical adapters, where each of the optical adapters is configured to optically connect an optical cable terminated with an optical connector (such as an LC or SC connector) with another optical cable terminated with a corresponding optical connector. Each optical adapter in each adapter pack can be designated as a port in the adapter pack. The ports in each adapter pack may be numbered for identification by a user. Accordingly, a first adapter pack and a second adapter pack may each have different ports numbered, for example, 1-24. However, in certain exemplary implementations, it is desired to view the ports on the different adapter packs as though the ports were from the same adapter packs.

As noted above, even when the PLM system includes some type of intelligence that enables the discovery of components by PLM management software and queried for identification information associated with that system (for example, a serial or other identification number and a make and model), location information typically must be manually entered into the PLM management system (for example, using a Web interface or mobile application). This is because the components are typically not aware of where they are located. The PLM management system is then able to associate the manually entered location information with the identification information that the PLM management software was able to automatically discover.

SUMMARY

Systems and methods for detecting component rotation within a communication assembly are provided. In certain embodiments, a system includes a plurality of modules; and a plurality of ports installed in each module in the plurality of modules, each port being associated with a port identification number, wherein port identification numbers for the plurality of ports are independently numbered from the port identification numbers for at least one other module in the plurality of modules. The system also includes a management entity configured to identify the ports on the plurality of modules, wherein the management entity uses remapped port identification numbers to identify the ports, wherein each remapped port identification number associated with each port in the plurality of modules is unique.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 2A and 2B are block diagrams of ports in multiple adapter blocks; and

In accordance with common practice, the various described features are not drawn to scale but are drawn to emphasize specific features relevant to the exemplary embodiments.

DETAILED DESCRIPTION

Figure 1:
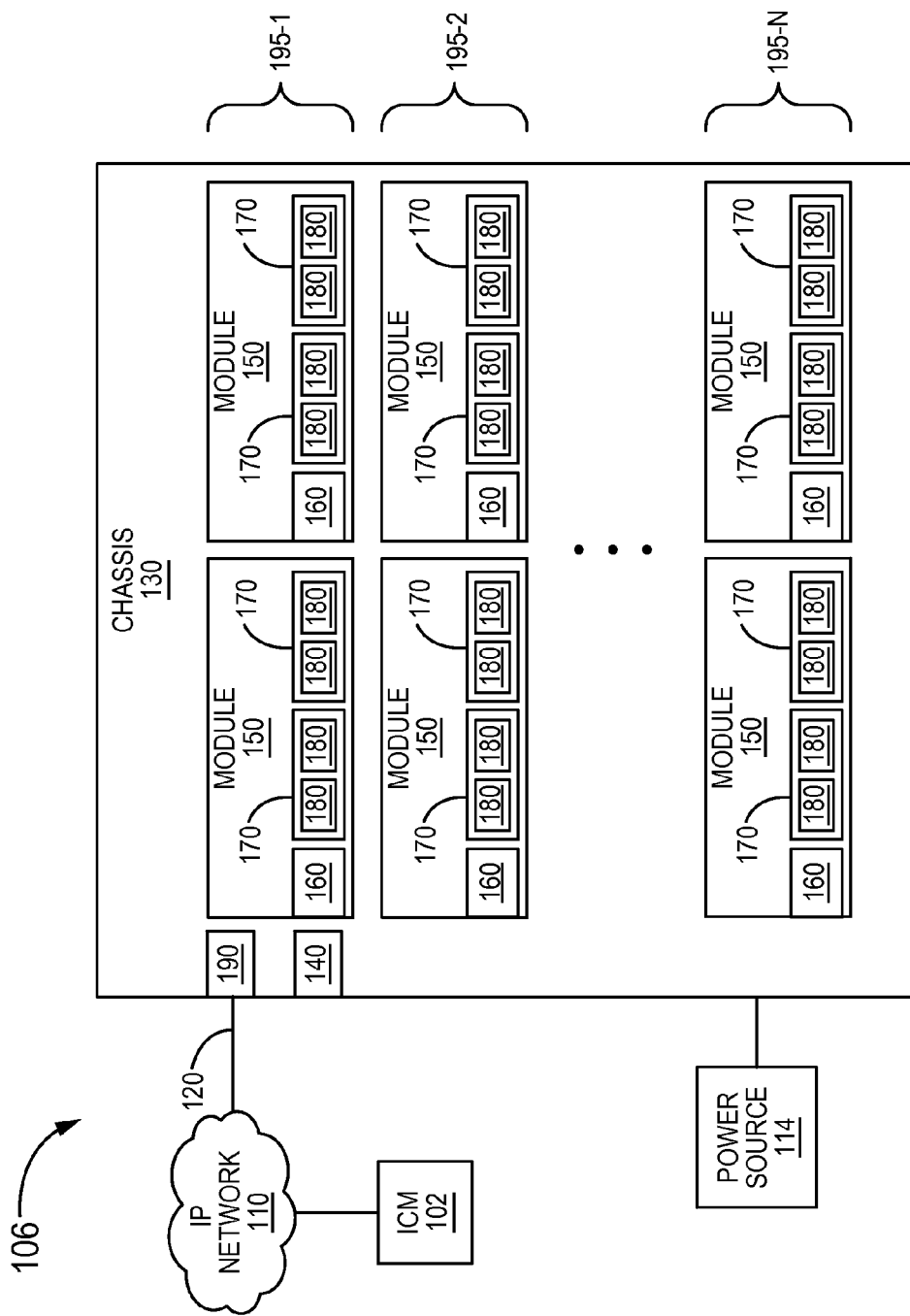
FIG. 1 is a block diagram of an exemplary embodiment of a communication system.

FIG. 1 shows one exemplary embodiment of a system that uses port mapping to identify adapters 180 within the adapter packs 170 that are inserted into a larger communication assembly 106. The larger communication assembly 106, into which the adapter packs 170 can be inserted, is configured to physically hold a communication sub-assembly (chassis) 130 in place. The assembly 106 includes a sub-assembly 130 containing multiple trays into which modules may be inserted. Each sub-assembly 130 is used to make connections between various cables (such as fiber optic cables terminated with LC, SC, Multiple-Push-On (MPO) connectors or copper cables such as CAT-5 or CAT-6 twisted-pair cables terminated with RJ-45 connectors).

In the exemplary embodiment described here in connection with FIG. 1, the assembly 106 comprise a sub-assembly 130 as described above. The chassis 130 is configured to hold multiple fiber optic modules 150 (for example, in a 4 Rack Unit (RU) sized chassis). The sub-assembly 130 may also be referred to here as a "chassis" 130. As mentioned above, the chassis 130 may comprise multiple trays 195-1-195-N onto which modules 150 may be installed. For ease of explanation, the chassis 130 is shown in FIG. 1 as being configured to house a number of modules 150 on the N trays 195-1-195-N, where N may be as few as one. For example, each tray 195-1-195-N may house two fiber optic modules 150. In at least one implementation, the chassis is powered by a power source 114.

Each optical module 150 is implemented on an optical tray that is configured to hold at least one multiple adapter pack 170. Each adapter pack 170 comprises multiple optical adapters 180, where each of the optical adapters 180 is configured to optically connect an optical cable (not shown) terminated with an optical connector (such as an LC, SC, or a Multi-fiber Push On (MPO) connector) with another optical cable (not shown) terminated with a corresponding optical connector. Again, for ease of explanation, in FIG. 1, each module 150 is shown as holding two adapter packs 170, and each adapter pack 170 is shown in FIG. 1 as holding up to two adapters 180; however, it is to be understood that each module 150 can be configured to hold any number of adapter packs 170, and each adapter pack 170 can be configured to hold any number of optical adapters 180. Also, it is to be understood that the techniques described here can be used for other types of connection devices including, for example, ones where a single cable (or a single cable bundle) is broken out in order to be connected to multiple cables or cable bundles (such as, for example, MPO, splitter, or cassette type devices).

In the exemplary embodiment described herein connected with FIG. 1, each of the connectors includes a respective non-volatile storage device (such as an EEPROM) that is used to gather information about the connector or the cable (for example, identification information for the cable or connector such as serial number or other identifier and make and model). Each module 150 includes a respective module controller 160. In certain implementations, each module 150 and the corresponding adapter packs 170 and optical adapters 180 are configured so that the module controller 160 for that module 150 can determine whether a connector is inserted into each optical adapter 180 and read the storage device associated with that inserted connector (if there is one). For example, each optical adapter 180 include one or more contacts or terminals that come into electrical contact with corresponding contacts or terminals on any connector that is inserted into the adapter 180, where such contacts or terminals are used to electrically couple the storage device for that connector to the corresponding module controller 160 so that the module controller 160 can determine if a connector is inserted into each optical adapter 180 and read information from a storage device attached to such a connector (if any). In some applications, connectors that include such storage devices are not used and, instead, connections are tracked by inferring connections using the functionality that determines whether a connector is inserted in each adapter or port. In some applications, a combination of the foregoing approaches is used.

Examples of such chassis 130, modules 150, adapter packs 170, and optical adapters 180 are described in the following United States Provisional Patent Applications: U.S. Provisional Patent Application Ser. No. 61/984175, filed Apr. 25, 2014, titled "Managed Connectivity in Cable Spool Assemblies"; and U.S. Provisional Patent Application Ser. No. 62/036326, filed Aug. 12, 2014, titled "Managed Connectivity in Cable Spool Assemblies". All of the preceding applications are incorporated herein by reference.

Each of the adapter packs 170 contains multiple adapters also known as ports. For example, an adapter pack, such as adapter pack 170, may have 24 or 48 ports divided between two opposing sides of the adapter pack 170. The adapter pack 170 provides connectivity between optical connectors that may have LC, SC, Multiple-Push-On (MPO) type connectors. In certain implementations, for example, when the adapter pack 170 provides an LC/LC connection, an SC/SC connection, an LC/SC connection, an MPO/MPO connection, or the like, the opposite sides of the adapter pack 170 may appear identical. In certain applications, when an adapter pack 170 supports duplex ports, the adapter pack 170 may include 24 ports divided between two opposing sides of the adapter pack 170, each side of the adapter pack 170 may have 12 ports. Similarly, when adapter pack 170 supports simplex ports, the adapter pack 170 may include 48 ports divided between two opposing sides of the adapter pack 170, each side of the adapter pack 170 may have 24 ports. The adapter packs may also include other numbers of ports on each side of the adapter pack 170. As illustrated in FIG. 1, each module 150 may respectively include two or more adapter packs 170, each adapter pack having a number of ports.

In the exemplary embodiment shown in FIG. 1, each chassis 130 includes a respective master controller 140 that is electrically coupled to the module controller 160 for each module 150 that is included in that chassis 130 (for example, using a respective flex circuit interconnect). In this exemplary embodiment, the master controller 140 and its associated module controllers 160 are configured to use a master-slave scheme for communicating with one another. In such a scheme, the master controller 140 serves as the "master," and each of the module controllers 160 serves as a "slave." For example, in one implementation of such a scheme, each module controller 160 determines when a connector has been inserted into an optical adapter 180 associated with that module controller 160 and reads information from the storage device attached or otherwise associated with that connector. When prompted to do so by the associated master controller 140, each module controller 160 informs the master controller 140 of any state changes for any of the optical adapters 180 associated with that module controller 160 (for example, that a connector has been inserted or removed from an optical adapter 180) and forwards to the master controller 140 information read from storage devices inserted into optical adapters 180 associated with that module controller 140.

In the exemplary embodiment shown in FIG. 1, the chassis 130 includes a management network interface 190 that can be used to couple the master controller 140 to an IP network 110 that is used for communicating the PLM information described below to a management entity 102. In an example implementation of such an embodiment, the management network interface 190 for each chassis 130 is implemented using an ETHERNET network interface (and associated RJ-45 port) so that the corresponding master controller 140 can be coupled to the IP network 110 using a CAT-5 or CAT-6 twisted-pair copper cable. It is to be understood, however, that the management network interface 190 can be implemented in other ways.

It is noted that, for ease of explanation, the IP network 110 is shown using a separate cloud symbol, but it is to be understood that the chassis 130 and cabling described here can be used to implement a part of the IP network 110 over which the PLM information is communicated. Alternatively, the IP network 110 over which the PLM information is communicated can be kept separate from the network that the chassis 130 and cabling are a part of.

The management entity 102 is typically implemented as software that runs on a computer that is coupled to the IP network 110. The management entity 102 is configured to receive information pertaining to various devices and media used to implement the physical layer in the network (including, but not limited to, the chassis 130 and the cables and connectors that make connections there). The physical layer information (PLI) that is communicated to the management entity 102 includes information about various devices in the network (also referred to here as "device information") as well as information about any segments of physical communication media attached to the ports of those devices (also referred to here as "media information"). The device information includes, for example, an identifier for each device, a type identifier that identifies the device's type, and port information that includes information about the device's ports. The media information includes information that is read from storage devices that are attached to various segments of physical communication media.

Examples of media information that can be stored in such storage devices include, without limitation, an identifier that uniquely identifies that particular segment of physical communication media (similar to an ETHERNET Media Access Control (MAC) address but associated with the physical communication media and/or connector attached to the physical communication media), a part number, a plug or other connector type, a cable or fiber type and length, a serial number, a cable polarity, a date of manufacture, a manufacturing lot number, information about one or more visual attributes of physical communication media or a connector attached to the physical communication media (such as information about the color or shape of the physical communication media or connector or an image of the physical communication media or connector), and other information used by an Enterprise Resource Planning (ERP) system or inventory control system. In other embodiments, alternate or additional data is stored in such storage devices. For example, testing, media quality, or performance information can be stored in such storage devices. The testing, media quality, or performance information, for example, can be the results of testing that is performed when a particular segment of media is manufactured or installed.

The information provided to the management entity 102 can also include information that is manually entered (for example, using a Web interface that is implemented by the management entity 102 or a mobile application).

The management entity 102 includes or uses a database or other data store (not shown) for storing the information provided to it. The management entity 102 also includes functionality that provides an interface for external devices or entities to access the physical layer information maintained by the management entity 102. This access can include retrieving information from the management entity 102 as well as supplying information to the management entity 102. In this example, the management entity 102 is implemented as "middleware" that is able to provide such external devices and entities with transparent and convenient access to the information maintained by the management entity 102. Because the management entity 102 aggregates information from the relevant devices in the network and provides external devices and entities with access to such information, the external devices and entities do not need to individually interact with all of the devices in the network that provide information to the management entity 102, nor do such devices need to have the capacity to respond to requests from such external devices and entities.

The management entity 102, in this example, implements an application programming interface (API) by which application-layer functionality can gain access to the physical layer information maintained by the management entity 102 using a software development kit (SDK) that describes and documents the API.

More information about physical layer information and the aggregation point 152 can be found in U.S. Provisional Patent Application Ser. No. 61/152,624, filed on Feb. 13, 2009, titled "MANAGED CONNECTIVITY SYSTEMS AND METHODS" and U.S. patent application Ser. No. 12/705,497, filed on Feb. 12, 2010, titled "AGGREGATION OF PHYSICAL LAYER INFORMATION RELATED TO A NETWORK", both of which are hereby incorporated herein by reference.

In the exemplary embodiment shown in FIG. 1, the master controller 140 in each chassis 130 is configured to interact with, monitor, and/or control the operation of the components of the chassis 130 (for example, any buttons (or other input components) and any light emitting diodes (LEDs) (or other visual indicators) incorporated into the body of the chassis 130 itself) as well as the module controllers 160. Also, the master controller 140 in each chassis 130 is configured to interact with external entities via the IP network 110. For example, each master controller 140 is configured to implement appropriate functionality and protocols for the master controller 140 to obtain an IP address (for example, a static IP address that is manually assigned to the master controller 140 via a Web or mobile app interface that is implemented by the master controller 140 or a dynamic IP address that is assigned to the module controller 140 via a Dynamic Host control Protocol (DHCP) server for the IP network 110). Also, each master controller 140 is configured to implement appropriate functionality and protocols for the master controller 140 to be discovered by, and to discover, the management entity 102. This discovery of and by the managing entity 102 can be done manually (for example, by manually providing an address for the master controller 140 to the managing entity 102 and by manually providing an address for the managing entity 102 to the master controller 140 using, for example, a Web or mobile app interface implemented by the master controller 140 and the managing entity 102) or automatically (for example, using a suitable discovery protocol such as the Universal Plug and Play (UPnP) discovery protocol).

As described above, in certain implementations, each adapter pack in the multiple adapter packs 170 in the modules 150 may include a series of consecutively numbered ports 180. For example, module 150 may include two adapter packs 170, where each adapter pack 170 in the module 150 includes multiple ports 180. Each of the adapter packs 170 includes at least two different adapter packs 170 that include consecutively numbered ports 180. For example, the ports 180 within a module may be identified by port identification numbers 1-12. To facilitate the use by a user, the ports 180 within the modules 150 on a tray 195 may be remapped such that the port identification numbers for ports from the different adapter packs on a tray 195 are different. For example, the port identification numbers for the different ports in the adapter packs within a tray 195 may be consecutively numbered. In one exemplary implementation, where each module has ports identified by port identification numbers 1-12, the ports are remapped such that one of the modules 150 has ports identified by port identification numbers 1-12 while the other module 150 has ports identification numbers remapped from 1-12 such that ports are identified by port identification numbers 13-24. Accordingly, the port identification numbers from the different modules 150 in a tray 195 will appear to a user to be consecutively numbered from 1-24.

In certain implementations, to remap the port identification numbers for ports 180 from different adapter packs 170 within a module 150, the remapping may be performed at the level of the adapter packs 170. For example, upon startup of the assembly 106, a master controller 140 discovers all the adapter packs 170 installed within a tray 195 in a chassis 130. Based on the location of an adapter pack 170 within a module 150, the master controller 140 sends a message at startup to each adapter pack 170 indicating the starting port identification number for that particular adapter pack 170. For adapter packs 170 having simplex adapters, the starting port identification number for the first adapter 180 in a module 150 would be 1 and the starting port identification number for the first adapter 180 in a second module 150 would be 25. Upon receiving the information from the master controller 140, each adapter pack 170 remaps the port identification numbers within that particular adapter pack. Any plug insertions/removals into the ports 180 are reported using the remapped port identification numbers and the remapped port identification numbers are also used to set port LEDs.

In an alternative implementation, the remapping of the ports 180 may be performed at the level of a master controller 140. For example, upon startup of the assembly 106, the master controller 140 discovers all the adapter packs 170 installed in the chassis 130. During normal operation, any port status changes to a port 180 in an adapter pack 170, such as plugins and removals, received from adapter packs 170 are processed by the master controller 140 and the port identification numbering is remapped based on the location and type of the adapter in the module 150 and the location of the module 150 within the tray 195. The port events along with the remapped port identification numbers gets reported to software executing on the management entity 102. Similarly when a command is received from the management entity 102 to set a port LED, the master controller 140 converts the remapped port identification number to the physical port identification number of the destination adapter and sends it to the corresponding adapter pack 170 to set the LED.

In a further implementation, the remapping of the port identification numbers for the ports 180 may be performed by the management entity 102. For example, the adapter 170 reports the port identification numbers of ports 180 as physically defined within the modules 150 and the master controller 140 passes the reported port identification numbers to the management entity 102 without making any changes to the port identification numbers received from the modules 150. When the port identification numbers are received by the management entity 102, the management entity 102 maps the ports based on the location of the adapters 180 within the module 150 and the location of the module 150 within the tray 195. Accordingly, for two simplex adapter packs 170 within a module 150, a user will see the ports identified as numbers 1 to 48 on a GUI screen produced by the management entity 102. When a port LED needs to be set, the user selects the remapped port identification numbers and then the management entity 102 converts the remapped port identification numbers into the physical port identification numbers on the particular module 150 before sending the command to master controller 140.

FIGS. 2A and 2B illustrate the remapping of port identification numbers. For example, FIG. 2A illustrates the actual physical port numbers for ports in a module 150 having duplex adapters. For example, each of the modules 150 includes ports identified by numbers 1-12, where the modules 150 function in a similar manner to modules 150 described above in relation to FIG. 1. As described above in the above description, the port identification numbering may be renumbered for presentation to a user through a GUI produced by the management entity 102. As shown in FIG. 2B, the renumbered ports show one of the modules 150 having port identification numbers 1-12 and a second module 150 having port identification numbers 13-24.

Figure 3:
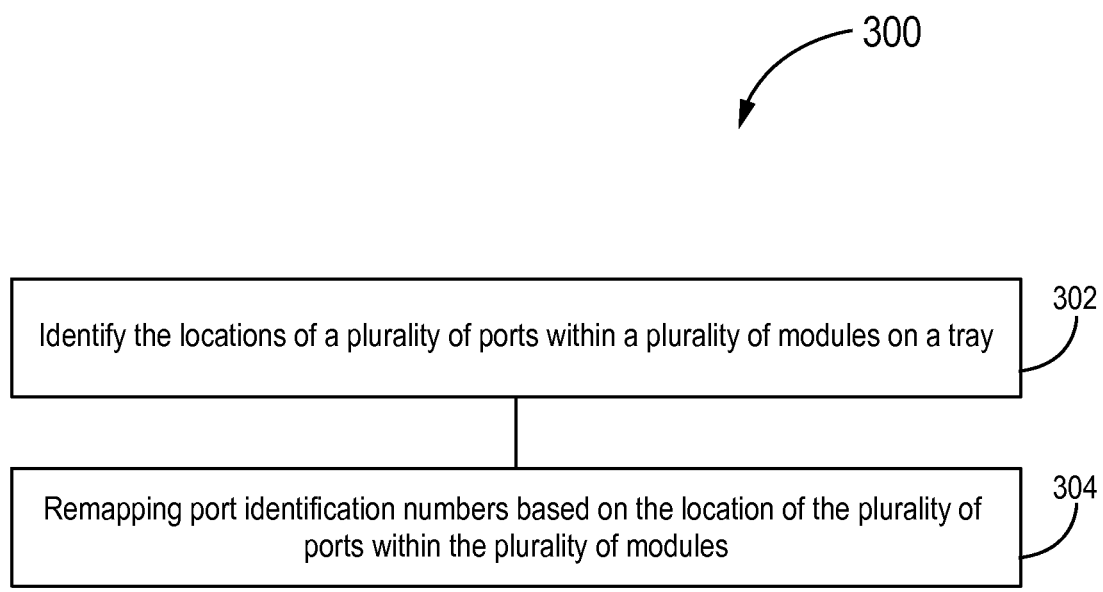
FIG. 3 is a flow diagram of an exemplary embodiment of a method for detecting module rotation within a communication sub-assembly.

FIG. 3 illustrates a method 300 for remapping port identification numbers. Method 300 proceeds at 302, where the locations of a plurality of ports within a plurality of modules is identified. For example, as described above, modules on a tray may have more than one adapter pack comprising multiple ports. As each module may contain ports having the same numbering, the ports may be renumbered so that the different ports in the modules on the tray may be uniquely numbered. As such, method 300 proceeds at 304, where port identification numbers are remapped based on the location of the plurality of ports within the plurality of modules. For example, the port identification numbers may be remapped at different components within an optical distribution assembly. In one implementation, the port identification numbers may be remapped by the adapter packs, at a master controller, or by a management entity as described above.

EXAMPLE EMBODIMENTS

Example 1 includes a system for remapping port numbering in a telecommunication system, the system comprising: a plurality of modules; a plurality of ports installed in each module in the plurality of modules, each port being associated with a port identification number, wherein port identification numbers for the plurality of ports are independently numbered from the port identification numbers for at least one other module in the plurality of modules; and a management entity configured to identify the ports on the plurality of modules, wherein the management entity uses remapped port identification numbers to identify the ports, wherein each remapped port identification number associated with each port in the plurality of modules is unique.

Example 2 includes the system of Example 1, further comprising: a chassis containing the plurality of modules, wherein each module comprises a module controller to communicate with the plurality of ports; and a master controller in the chassis, the master controller configured to communicate with at least one module controller in the plurality of modules.

Example 3 includes the system of Example 2, wherein the master controller identifies the locations of ports in the plurality of modules and assigns a starting port identification number to the plurality of modules based on the locations of the plurality of modules, adapter packs within the modules remapping the port identification numbers based on the assigned starting port identification number.

Example 4 includes the system of Example 3, wherein the modules report state changes for the ports to the master controller using the remapped port identification numbers.

Example 5 includes the system of any of Examples 2-4, wherein the master controller identifies the locations of ports in the plurality of ports, wherein the master controller converts the remapped port identification numbers from the management entity to the port identification numbers for the plurality of ports.

Example 6 includes the system of any of Examples 1-5, wherein the management entity remaps the port identification numbers based on the locations of the plurality of ports in the at least one module.

Example 7 includes the system of Example 6, wherein the management entity: receives at least one remapped port identification number; converts the at least one remapped port identification number to at least one port identification number; and transmit the at least one port identification number to master controller.

Example 8 includes the system of any of Examples 1-7, wherein the management entity is coupled to a user interface that identifies the ports with the remapped port identification numbers.

Example 9 includes the system of any of Examples 1-8, wherein the remapped port identification numbers are incrementally numbered up to the number of ports in the plurality of modules.

Example 10 includes an assembly comprising: at least one chassis into which a plurality of modules can be inserted, wherein a module in the plurality of modules comprises a plurality of ports, wherein each port in the plurality of ports is identified by a port identification number; and a management entity configured to control the operation of the assembly, wherein the management entity identifies the ports in the plurality of modules, wherein the management entity uses remapped port identification numbers to identify the ports, wherein each remapped port identification number associated with each port is unique.

Example 11 includes the assembly of Example 10, wherein the at least one chassis comprises a master controller, the master controller configured to communicate with at least one module controller in each module in the plurality of modules.

Example 12 includes the assembly of Example 11, wherein the master controller identifies the locations of ports in the plurality of modules and assigns a starting port identification number to the plurality of modules based on the locations of the plurality of modules, adapter packs within the modules remapping the port identification numbers based on the assigned starting port identification number.

Example 13 includes the assembly of Example 12, wherein the modules report state changes for the ports to the master controller using the remapped port identification numbers.

Example 14 includes the assembly of any of Examples 11-13, wherein the master controller identifies the locations of ports in the plurality of ports, wherein the master controller converts the remapped port identification numbers from the management entity to the port identification numbers for the plurality of ports.

Example 15 includes the assembly of any of Examples 10-14, wherein the management entity remaps the port identification numbers based on the locations of the plurality of ports in the at least one module.

Example 16 includes the assembly of Example 15, wherein the management entity: receives at least one remapped port identification number; converts the at least one remapped port identification number to at least one port identification number; and transmit the at least one port identification number to the master controller.

Example 17 includes the assembly of any of Examples 10-16, wherein the management entity is coupled to a user interface that identifies the ports with the remapped port identification numbers.

Example 18 includes a method for remapping port identification numbers, the method comprising: identifying the locations of a plurality of ports within a plurality of modules, wherein each port is identified by a port identification number; and remapping port identification numbers based on the locations of the plurality of ports within the plurality of modules, wherein each remapped port identification number in the remapped port identification numbers is unique for the ports.

Example 19 includes the method of Example 18, wherein a master controller in a chassis containing the plurality of modules is configured to communicate with at least one module controller in each module in the plurality of modules.

Example 20 includes the system of Example 19, wherein remapping the port identification numbers comprises assigning a starting port identification number to adapter packs containing the plurality of ports by the master controller based on the locations of the plurality of ports, wherein the adapter packs remap the port identification numbers based on the assigned starting port identification number.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

What is claimed is:

1. An assembly comprising:
    at least one chassis into which a plurality of modules can be inserted, wherein each module in the plurality of modules comprises a plurality of ports, wherein each port in the plurality of ports is identified by a port identification number, wherein port identification numbers for the plurality of ports for each module in the plurality of modules are independently numbered from the port identification numbers for the plurality of ports of other modules in the plurality of modules; and
    a management entity configured to control the operation of the assembly, wherein the management entity identifies the ports in the plurality of modules, wherein the management entity uses remapped port identification numbers to identify the ports, wherein each remapped port identification number associated with each port in the plurality of modules is unique.

2. The assembly of claim 1, wherein the at least one chassis comprises a master controller, the master controller configured to communicate with at least one module controller in each module in the plurality of modules.

3. The assembly of claim 2, wherein the master controller identifies the locations of ports in the plurality of modules and assigns a starting port identification number to the plurality of modules based on the locations of the plurality of modules, wherein adapter packs within the modules remap the port identification numbers based on an assigned starting port identification number received from the master controller.

4. The assembly of claim 3, wherein a module controller in the at least one module controllers report state changes for the ports of an associated module to the master controller using the remapped port identification numbers.

5. The assembly of claim 2, wherein the master controller identifies the locations of ports in the plurality of ports, wherein the master controller converts the remapped port identification numbers from the management entity to the port identification numbers for the plurality of ports.

6. The assembly of claim 1, wherein the management entity remaps the port identification numbers based on the locations of the plurality of ports in the at least one module.

7. The assembly of claim 6, wherein the management entity:
    receives at least one remapped port identification number;
    converts the at least one remapped port identification number to at least one port identification number; and
    transmit the at least one port identification number to the master controller.

8. The assembly of claim 1, wherein the management entity is coupled to a user interface that identifies the ports with the remapped port identification numbers.

* * * * *